Oct. 3, 1967   R. E. MACHEREY   3,345,555
ENERGIZING CIRCUIT FOR POSITIONING SYSTEM TRANSDUCER
Filed April 8, 1964   2 Sheets-Sheet 1
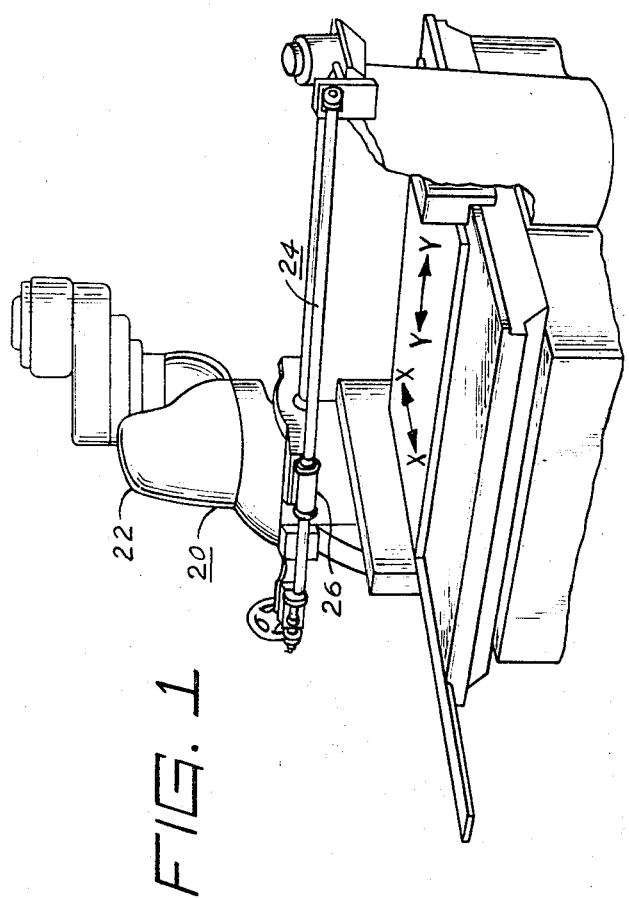
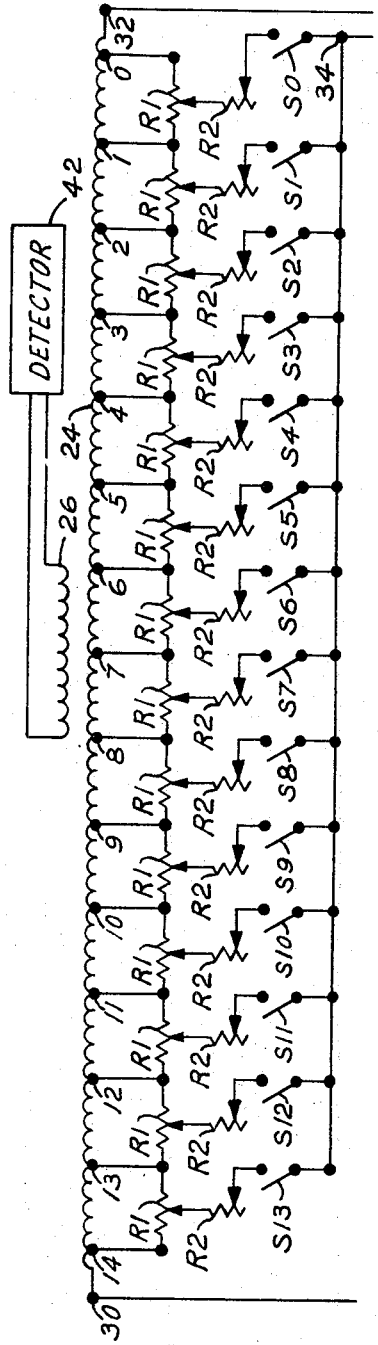
INVENTOR.
ROBERT E. MACHEREY
BY

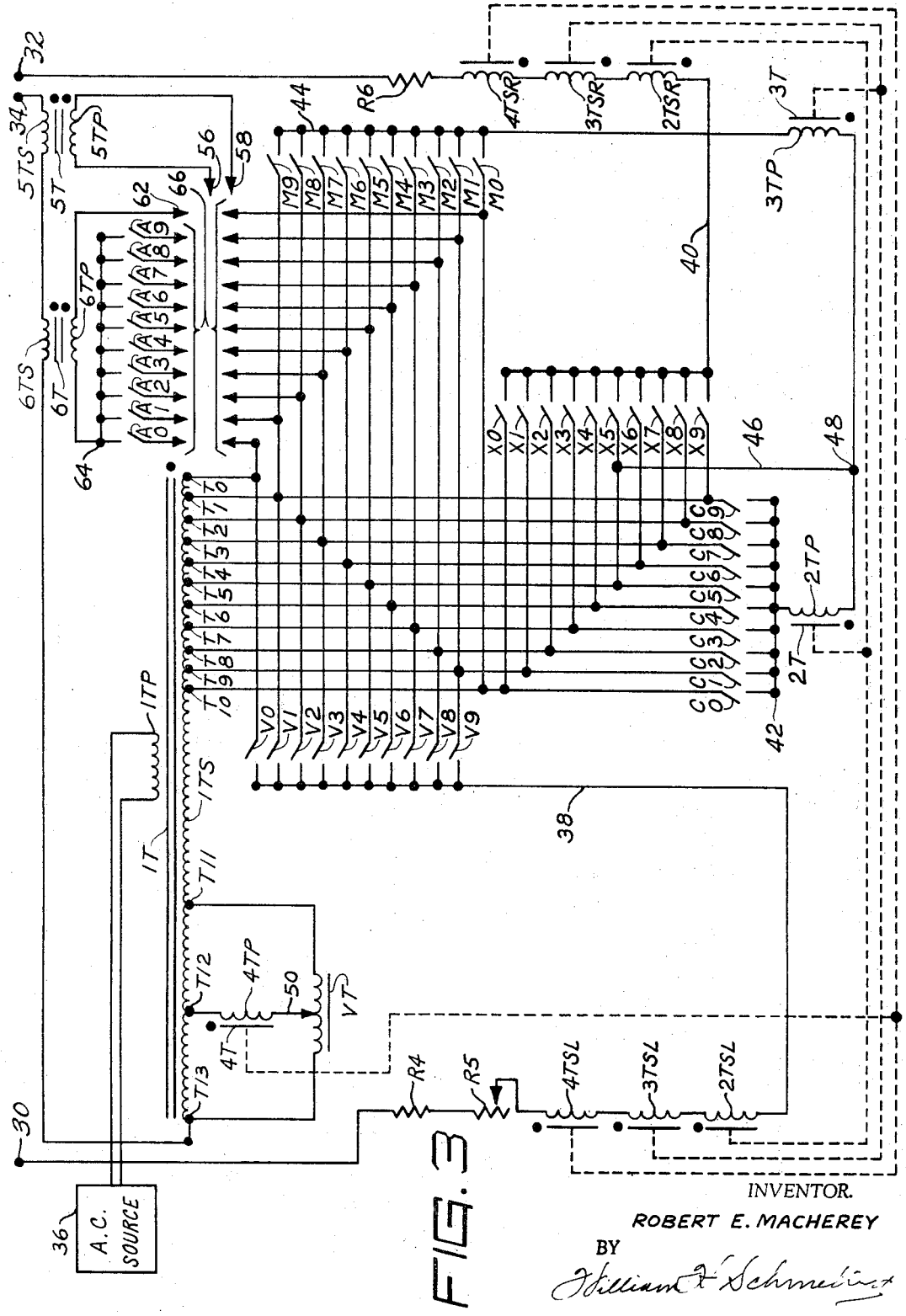

United States Patent Office 3,345,555
Patented Oct. 3, 1967

3,345,555
ENERGIZING CIRCUIT FOR POSITIONING
SYSTEM TRANSDUCER
Robert E. Macherey, Mequon, Wis., assignor to Square D
Company, Park Ridge, Ill., a corporation of Michigan
Filed Apr. 8, 1964, Ser. No. 358,254
10 Claims. (Cl. 323—43.5)

ABSTRACT OF THE DISCLOSURE

A circuit having resistor networks connected between one side of an alternating current source and each of the taps of a primary winding of a positioning transducer to equalize the impedance of sections of the primary winding extending in opposite directions from any one of the taps which may be selected for positioning purposes and means for varying the voltage across both sections inversely in discrete steps for dividing the distance between the taps whereat a secondary winding of the transducer provides a null signal so that the operation of the transducer will be unaffected in variations in voltage of the source.

---

This invention relates to positioning control systems and is more particularly concerned with a system for precisely indicating the relative positions of two relatively movable members.

The present invention is basically concerned with an apparatus and system which will indicate the relative position of a member relative to a reference and is particularly suited for use with various production machines, such as machine tools, conveyors, gages and the like, where it frequently is necessary to determine when two relatively movable members are in a precise, predetermined position relative to each other. The positioning system according to the present invention will determine the relative position of a member in a predetermined path of travel, whether the path of travel be a straight or curved line, and to that extent the system may be construed as measuring linearly. The system is noncyclic, because it will continuously indicate the direction of displacement of a member from a predetermined point; and is static in nature because it may be constructed without moving contacts or other wearing parts.

The present invention is directed to certain improvements in a basic control system as disclosed and claimed in a United States Patent No. 2,962,652, which was granted to Leander J. Bulliet on Nov. 29, 1960. The system as disclosed by Bulliet includes an elongated primary winding hereinafter called "primary," which is energized from a single phase source of alternating current. The wire convolutions of the primary are preferably wound on a support of nonferrous material and is provided with a pair of input terminals adjacent its ends. Located at spaced predetermined intervals, e.g., one inch intervals, along the primary coil between the input terminals, are spaced taps which in turn are connected to a selector switch. When both of the input terminals of the primary are connected to one of the terminals of a single phase alternating crurent source and any one of the taps is connected through the selector switch to the other terminal of the source, then alternating current will flow in opposite directions in the two sections of the primary coil defined by the terminals at the ends of the coil and the selected tap. When the current thus flows through the sections, the voltage in the sections will be 180° out of phase from each other and the current flow in the sections will be in opposite directions.

The basic control system also includes a secondary coil which is mounted so that the primary and secondary are relatively movable. The secondary is inductively coupled with the primary coil and is provided with a pair of output terminals across which the voltage induced in the secondary by the primary coil will be impressed.

It has been previously stated that current flows in opposite directions in the sections of the primary which extend in opposite directions from the selected tap. Thus, theoretically, if the secondary is centered at the selected tap, then the voltages induced therein by the currents flowing through the turns of the primary coil extending respectively in opposite directions of the selected tap are equal and opposite and the output of the secondary will be zero. When the secondary is displaced from its centered position, the section of the primary toward which the secondary is displaced will have its inductive coupling increased while the section of the primary from which the secondary was displaced would have its coupling decreased. When the secondary is thus displaced, the voltages induced therein by the respective primary sections will no longer be equal and opposite and a resultant voltage will appear at the output terminals of the secondary, the phase of which indicates the direction of the displacement.

In United States Patent No. 3,244,956, filed on Feb. 7, 1963 as a continuation of a later abandoned application, Ser. No. 842,001 which was filed on Sept. 24, 1959, the inventor Robert C. Mierendorf, who assigned both applications to the assignee of the present invention, disclosed that an absolute null voltage output of the secondary coil was not realized when the secondary coil is accurately positioned over the selected tap. Mierendorf further observed that the voltages induced in the secondary coil were not symmetrical and a minimum secondary output signal continuously existed which varies in phase and amplitude as the various taps on the primary coil are selected and that wave form distortions or harmonics were introduced in the secondary output from the primary coil and from other sources.

Further, the basic system as disclosed by Bulliet required that either the primary or secondary coils be physically displaced by a micrometer vernier adjustment to provide the zero offset for the apparatus. This feature was added so that the apparatus could be calibrated when a part was positioned on the machine to which the positioning system is attached, so that the measuring system could be displaced to compensate for displacements of the part on the machine.

The present invention is directed to certain improvements in the positioning systems disclosed by Bulliet and Mierendorf and includes an arrangement whereby accurate positioning of the secondary at points intermediate the taps on the primary is accomplished without being affected by variations in the supply voltage and an arrangement whereby changes in the currents in the primary winding are used to accomplish the zero offset of the system so as to eliminate the requirements of the mechanical adjustment of Bulliet and to provide a less sophisticated arrangement for accomplishing the result as disclosed by Mierendorf. The present invention also includes an arrangement which employs adjustable resistors for compensating for the variations in impedance of the two sections of the primary when the secondary is positioned at a location removed from the center of the primary winding. These resistors replace the less sensitive and more costly pair of precision tapped transformers which were employed by Mierendorf to accomplish the result.

It is an object therefore of the present invention to provide a position indicating system which will incorporate the features above discussed.

Another object of the present invention is to provide a position indicating system which includes an elongated primary winding and a secondary winding which is axially movable relative to the primary winding and inductively coupled thereto to have an alternating voltage induced therein by the primary winding and to provide the primary winding with selectable spaced taps which are located between the end terminals on the primary winding thereby dividing the primary into two sections of varying predetermined lengths which sections will have variable inductive coupling with the secondary winding, depending on which tap is selected, with an impedance means which includes a plurality of adjustable resistors which are connected between the taps to equalize the inductive coupling of said sections to maintain the voltages induced in the secondary winding by the respective sections symmetrical.

A further object of the present invention is to provide a position indicating system which includes a multitap primary winding and a secondary winding which is inductively or magnetically coupled thereto with a means which will equalize the impedance across the two sections of the primary winding, said sections being defined as the portions of the primary winding which extend in opposite directions from any one of the taps of the primary winding and the terminals adjacent the ends of the primary winding with a means which will selectively vary the voltage inversely across the sections in discreet steps, whereby the ratios of the voltages induced in the respective sections in the secondary winding will be constant in spite of variations in the supply voltage.

It is still another object of the present invention to provide a position indicating system which includes a multitap primary winding and a secondary winding which is inductively coupled and movable axially relative to the primary winding with a means including adjustable resistors which will maintain the inductive coupling between the secondary winding and the two sections of the primary winding equal, regardless of which tap is selected, a means for selectively and inversely varying the ratio of current flow in the sections of the primary winding independently of voltage variations of the source and a means for selectively changing current flows in the sections of the primary winding to accomplish a zero offset function of the system.

Further objects and features of the invention will be readily apparent to those skilled in the art from the specification and appended drawings illustrating certain preferred embodiments in which:

FIG. 1 is a perspective view of a vertical drilling machine to which the present invention may be applied.

FIGS. 2 and 3 show a schematic wiring diagram of the circuitry incorporating the features of the present invention.

Referring now to the drawings, and to FIG. 1 particularly, there will be seen a single vertical spindle drilling machine of the type well known in the art, indicated by the numeral 20. The drilling machine includes a spindle head 22 mounted on a crossrail, and movable in the direction marked Y—Y. The spindle head 22 is preferably movable by means of a lead screw (not shown), but also could be moved by suitable hydraulic means. The machine 20 further has a worktable to which work pieces may be secured by suitable means, such as screws, two clamps, etc., not shown. The worktable is movable in the direction indicated as X—X in FIG. 1, and may be moved by a lead screw driven by an electric motor or other suitable driving means, such as hydraulic means. The specific structure for effecting the movement in the X—X and Y—Y directions is not shown since this is well known in the art. In the conventional construction of the machine, each slide motion is provided with a scale for vernier reading to thousandths of an inch. Accordingly, the spindle centerline can be positioned to any desired location over the worktable and, hence, over the surface of the work piece by setting of the X and Y dimensions on the respective scales.

Such positioning by scale reading is time consuming, and, to some extent, difficult. It is necessary for the operator to position himself next to the location of the scale and then to "sort out" the inch marks visually. The operator must further read the tenths, hundredths and vernier marks. Accordingly, as set forth immediately hereinafter, the machine has been modified to incorporate the electrical measuring or positioning system according to the present invention. The devices for measuring or positioning in the Y—Y direction are shown and hereinafter described. It will be understood that the devices are duplicated for positioning in the X—X direction.

The position indicating device as used with the present invention comprises a primary winding 24 and a secondary winding 26. The primary winding 24 comprises a continuous wire which is wound to form a great many turns which are suitably supported and preferably extend across the width of the machine 20, as in FIG. 1. A support for the convolutions of the primary which is not specifically shown, preferably is of nonferrous material, such as a polystyrene rod or aluminum tube which will not sag with age and, if possible, will have a coefficient of expansion which approximates the materials of the machine to which the support is attached. This will minimize the effects of temperature variations in the positioning system.

As shown in FIG. 2, primary winding 24 is provided with a plurality of taps indicated by numerals 0–14. These taps are located between terminals 30 and 32 which are adjacent the ends of the primary coil 24. The taps 0–14 are typically positioned at every inch along the primary, which is likely to be several feet in length. Thus the numbers of taps which are shown as 14 in FIG. 2 is illustrative, but not necessarily representative. In the simplified form shown in FIG. 2, the taps 0–14 are each interconnected by series connected adjustable resistors R1 so the resistors are in parallel circuits with the respective portions of the primary winding between the taps 0–14. Each of the resistors R1 has an adjustable slider which is connected through an adjustable resistor R2 to switches which are respectively designated as S0–S13, as shown. The switches S0–S13 which are connected through a common bus to a terminal 34 each have normally open switch contacts and in actual practice may be part of a selector switch or switches which are arranged to close the contacts of any selected one of switches S0–S13 when the selector switches are operated.

A single phase alternating current source 36, shown in FIG. 3, is connected to energize a primary winding 1TP of a transformer 1T which has a secondary winding 1TS. The source 36, which may be of any conventional type, preferably is arranged to supply a substantially constant voltage at frequencies higher than 60 cycles or multiples thereof. This will minimize the effects on the control system from the undesirable influences of voltage signals which may be generated by other electrical equipment operating in the vicinity of the positioning system herein described. An example of a frequency herein contemplated is a frequency of 400 cycles.

The secondary winding 1TS is provided with a plurality of accurately located taps T0–T13, as shown. The sections of the secondary winding 1TS between taps T0–T1, T1–T2, etc., through T10, are each arranged to provide an alternating voltage of two volts between the adjacent taps. The section of the secondary between taps T10–T11 is arranged to provide a voltage of twenty volts and the portions of the secondary winding 1TS between taps T11–T12 and T12–T13 are each arranged to provide a voltage of ten volts between taps T11–T12 and a similar voltage of ten volts between taps T12–T13. The taps T0 through T9 are respectively connected through a plurality of normally open switches V0–V9 to a lead 38. Similarly, the taps T10 through T1 are respectively connected through a plurality of normally open switches X0 through X9 to a lead 40. The taps T10 through T1 additionally are respectively connected through normally open switches C0–C9 to a common bus 42 and through normally open switches M0–M9 to a common bus 44. As will become hereinafter apparent, the switches V and X provide a tenth inch increment, the switches C provide the hundredths inch increment and the switches M provide the thousandths inch increment for the system.

A lead 46 is connected between the tap T5 and a terminal 48. A primary winding 2TP of a transformer 2T is connected between the terminal 48 and the bus 42. Similarly, a primary winding 3TP of a transformer 3T is connected between the terminal 48 and the bus 44.

A variable transformer, such as a Variac VT, has one input terminal connected to tap T11 and another input terminal connected to tap T13. Connected between an output terminal 50 of the Variac VT and the tap T12 is a primary winding 4TP of a transformer 4T. Each of the transformers 2T, 3T and 4T have a pair of secondary windings respectively designated as 2TSL, 2TSR, 3TSL, 3TSR, 4TSL and 4TSR. The association between the primary and secondary windings of transformers 2T, 3T and 4T is shown by broken lines in FIG. 3.

The end terminal 30 is connected to lead 38 through a circuit which includes a resistor R4, an adjustable resistor R5 and the secondary windings 4TSL, 3TSL and 2TSL in which the resistors and secondary windings are connected in series with each other. Similarly, the end terminal 32 is connected to lead 40 by a similar series circuit which includes a resistor R6 and the secondary windings 4TSR, 3TSR and 2TSR.

The junction 34 is connected to the tap T13 by a series circuit which includes a secondary winding 5TS of a transformer 5T and a secondary winding 6TS of a transformer 6T. The transformer 5T has a primary winding 5TP which is connectable to any of the taps T0–T10 as will be hereinafter described. The transformer 6T has a primary winding 6TP. The primary winding 6TP has one input terminal directly connectible to any of the taps T0–T10 and the other input terminal selectively connectible through switches A0–A9 to the respective taps T0–T10, as will be later explained.

The apparatus shown in FIGS. 1 and 2 includes the secondary winding 26 which, in the preferred embodiment of the present invention, is mounted by a support on the machine 20 so the secondary winding 26 is coaxial to the primary winding 24 and is axially movable along the primary winding 24 without physical contact therewith. The secondary winding 26 has a plurality of turns which are inductively coupled to the primary winding 24. The ends of the secondary winding 26 are connected to a pair of output terminals which supply an input to a detector 42. The detector 42, which per se does not constitute one of the features of the present invention, is arranged to sense both the magnitude and phase of the output voltage of the secondary winding 26 and in response thereto provide suitable signals to means, not shown, which will cause movement of the spindle head 22 to a position sensed by the secondary winding 26, as will be explained.

It will be seen that selective activation of the switches S0–S13 effectively divides the primary winding 24 into a plurality of pairs of sections of varying lengths, depending on the particular switch S0–S13 which is closed. Thus, if the switch S7 is closed, the portion of the primary winding 24 extending to the left of the tap 7 and the end terminal 30 will provide one section and the portion of the primary winding 24 extending to the right of the switch S7 to the terminal 32 will provide the other section. Further, it will be seen that as the switches S7–S13 are individually closed in sequence while all the remaining switches S0–S13 remain open, the length of section to the left of the closed switch S7–S13 will decrease and the length of section to the right will increase incrementally as the switches S7–S13 complete the circuits to the various taps 7–13. Also as the switches S7–S0 are individually closed in sequence, while all of the remaining switches S0–S13 remain open, the length of the section of the primary winding 24 to the left of the closed switch S7–S0 will sequentially increase and the section of the primary winding 24 to the right of the closed switch will sequentially decrease as the switches S7–S0 sequentially complete the circuits to the taps 7–0. However, for each closure of the individual switches S0–S13, a pair of sections of the primary winding 24 will exist. Thus as the switches S0–S13 are closed to select the various taps 0–13, a plurality of sections of the primary winding 24 of varying predetermined lengths will be provided.

Each of the primary and secondary windings of the transformers 1T, 2T, 3T, 4T, 5T and 6T have polarities indicated by the dots at their respective ends. The ratio of the primary to secondary voltages of transformers 2T is 10 to 1, 3T is 100:1, 4T is 10:1, 5T is 5:1, and 6T is 50:1.

It is believed the operation of the circuit shown in FIG. 2 will be most readily understood from the description of the sequence used in adjusting the components of the system to cause the secondary winding 26 to provide a null or zero output signal at any desired location of the primary winding 24. The primary winding 24 shown in FIG. 2 will provide signals to the secondary winding 26 which will permit accurate positioning of the secondary over a length of 13.999 inches. The preferred method of adjusting the system is to begin with all of the switches S0–S13 open except switch S7, which is closed. The Variac VT is adjusted so a zero voltage is impressed across primary winding 4TP. The primary windings 5TP and 6TP are shorted so the secondary windings 5TS and 6TS will be deenergized. The tenths switches V5 and X5, the hundredths switch C5 and the thousandths switch M5, are closed. Thus the switches S7, V5, X5, C5 and M5 will be set to indicate a position of 7.555 on the primary winding 24. It will be seen that when switches C5 and M5 are closed, the primary windings 2TP and 3TP are effectively shorted by lead 46 and terminal 48 so the secondary windings 2TSL, 2TSR, 3TSL and 3TSR will be de-energized. The leads 38 and 40 which are connected in circuit with the terminals 30 and 32 of the primary winding 24 are connected through switches V5 and X5 to the same tap T5 of the primary winding 1TP. Thus the sections of the primary winding to the left and to the right of the tap 7 will be supplied with current from equal voltage sources. It will be seen that the tap 7 is connected through resistor R1, resistor R2, switch S7, terminal 34, secondary windings 5TS and 6TS to the tap T13 on one end of the secondary winding 1TS. Tap 7 is also connected through the portion of primary winding 24 to the left of tap 7 and terminal 30, resistors R4 and R5 and transformer secondary windings 4TSL, 3TSL and 2TSL to lead 38 which is connected through switches V5 to tap T5 on the secondary winding 1TS. Similarly, tap 7 is connected through the portion of the primary winding 24 to the right of tap 7 and terminal 32, resistor R6 and transformer secondary windings 4TSR, 3TSR and 2TSR to lead 40 which is connected through switch X5 to the same tap T5 on secondary winding 1TS. Thus as the portions of the primary winding 24 to the left and right of tap 7 are connected to the same tap T5 which is on the other end of secondary winding 1TS from tap T13, each of the sections of the primary winding 24 will be supplied 50 volts from the secondary winding 1TS. With the aforementioned switches closed, the potentiometer resistor R2 in series with switch S7 and the poteniometer resistor R1 between taps 7 and 8 is adjusted at some random midpoint and resistor R5 is adjusted so the current flow at terminal 30 equals the current flow at terminal 32.

The secondary winding 26 is then physically moved to a position so its physical center corresponds to a location of 7.555 inches on the machine 20. After the primary winding 24 is moved relative to the machine 20 to a position which will cause the secondary winding 26 to provide a zero or a null output signal, the primary is clamped in position.

The secondary winding 26 is then moved so its physical center is located at a position corresponding to 7.000 on the machine 20. The switches S7, V0, X0, C0 and M0 are then closed so their collective settings indicate a reading of 7.000. It will be seen that the lead 38, which is connected to the left end of the primary winding 24 at terminal 30, is connected through switch V0 to tap T0 of secondary winding. Thus the portion of the primary winding 24 to the left of tap 7 will be energized by a 60 volt source. The lead 40, which is connected to the right end portion of primary winding 24 at terminal 32, is connected through switch X0 to tap T10. Thus the portion to the right of tap 7 will be energized by a 40 volt source. Additionally, because of the polarities of the primary and secondary windings of transformers 2T and 3T, and because the primary windings 2TP and 3TP are energized by the ten volt source between taps T5 and T10, the secondary windings 2TSL and 3TSL will provide an additional $1\frac{1}{10}$ volts to the portion of primary winding to the left of tap 7 and the secondary windings 2TSR and 3TSR will provide an opposition voltage of $1\frac{1}{10}$ volts to the portion of the secondary winding to the right of tap 7. Thus the portion to the left of tap 7 will be energized by a $61\frac{1}{10}$ volt source while the portion to the right of tap 7 will be energized by a $38\frac{9}{10}$ volt source.

As previously stated, the currents in the primary winding 24 and the physical position of the secondary winding 26 and the primary winding 24 were initially adjusted so the secondary winding 26 provided a zero output signal when equal currents were flowing in the sections of the primary winding 24 to the left and right of tap 7 and the secondary winding was positioned at 7.555 inches on the machine 20. When the switches S7, V0, X0, C0 and M0 are closed, the portion of the primary winding 24 to the left of tap 7 is supplied by a $61\frac{1}{10}$ volt source and the portion to the right of tap 7 is supplied by a $38\frac{9}{10}$ volt source, so the currents in the left and right sections of the primary winding 24 are no longer equal. Thus the secondary winding 26 must be displaced to the right to balance the inductive coupling effect between the portions of the primary winding 24 to the left and right of tap 7 and the secondary winding 26, so the secondary winding 24 will provide a zero output signal. If the parameters of the primary winding 24 and the secondary winding 26 are properly selected and the foregoing voltage differences are used, the ratios of current flowing in the left and right portions of the primary winding 24 will require that the secondary winding be positioned at the 7.000 inch position on the machine. An example of the parameters herein contemplated includes a secondary winding 26 having a length of 5 inches with approximately 5,000 turns of wire of #27 AWG size having a coil diameter of 3 inches and a primary winding 24 having a diameter of 1½ inches wound with #20 AWG wire to have a lead of 20 turns per inch. The foregoing example is for illustrative purposes only, as other parameters including other voltage differences may be employed without departing from the spirit of operation of the positioning system herein described.

With switches S7, V0, X0, C0 and M0 closed to provide the voltages above described, the secondary winding 26 is then physically centered at the 7.000 position on the machine 20. Usually when the foregoing voltages are applied to the right and left portions of the primary winding 24 and the secondary winding 26 is positioned as described, the output signal of secondary winding 26 will not be zero. While all of the reasons which cause a discrepancy between the expected and actual signal from the secondary winding 26 are not understood, it is believed that some of the factors which contribute to the discrepancy of the signal from the secondary winding 26 is caused by variations in the inductive coupling between the unequal lengths of primary winding 24 and the secondary winding 26 as the secondary winding 26 is displaced from its center position and variations in the wire arrangements and size of the secondary winding 26. The effect of these and other unknown variations are neutralized by compensating the current flow in both the right and left portions of the primary winding. This result is accomplished by including a means in the circuit between the selected tap and the terminal of the source to which the tap is connected for either aiding or opposing the current flow through the tap. As shown in FIG. 3 of the drawings, these means comprise the transformers 5TP and 6TP.

The primary winding 5TP is connected through a pair of leads to a pair of terminals 56 and 58 which are indicated as arrow heads. The terminals 56 and 58 are arranged so they may be connected to any of the taps T0–T10. The secondary winding 5TS, which is supplied with current from the primary winding 5TP, is connected in circuit between the selected tap 7 on the primary winding 24 and through the secondary winding 6TS to the tap T13 of the transformer 1T. Thus, depending upon the connections of terminals 56 and 58 to taps T0–T10, the secondary winding 5TS will either aid or oppose the current flow in the circuit between the selected tap 7 on the primary winding 24 and tap T13, and the magnitude of the effect of the secondary winding 5TS may be varied by a selective connection of terminals 56 and 58 to the various taps T0–T10.

One end of the primary winding 6TP is connected through a lead to a terminal 62 which is indicated by an arrowhead. The terminal 62 is arranged to be connected to any of the taps T0–T10. The other end of the primary winding 6TP is connected through a lead to a bus lead 64 which can be selectively connected through switches A0–A9 and additional lead terminals 66, indicated by arrowheads, to any tap T0–T10. The switches A0–A9 are preferably arranged to be closed respectively with the respective closure of switches V0–V9 and X0–X9. Thus the switches will close in groups as follows: A0–V0–X0, A1–V1–X1, A2–V2–X2, etc. The terminals 66 may be connected at random to any of the taps T0–T10. Thus when the switches, S7, V0, X0, C0, M0 and A0 are closed, the terminal 66 may be connected to any one of the taps T0–T10 so the output of the secondary winding 6TS will either oppose or aid the current flow in the circuit between the tap 7 and tap T13 to change the output signal of the secondary winding to zero. When the foregoing adjustments are consumated the primary winding 24 and secondary winding 26 will be adjusted so the secondary will provide a zero or null signal at both the 7.555 and the 7.000 of the machine.

After the foregoing adjustments have been completed, the following switches are closed: S7, V1, X1, C0 and M0, together with switch A1, and all of the other switches are in the open position. When the foregoing switches are closed, the system is adjusted to require positioning of the secondary winding at 7.100 of the machine. The voltage supplied across the portion of the primary winding 24 to the left of tap 7 will now be $59\frac{1}{10}$ volts and the voltage supplied across the portion of the primary winding 24 to the right of tap 7 will be $40\frac{9}{10}$ volts. Thus when the secondary winding 26 is accurately positioned so its physical center is located at a position corresponding to 7.100 inches on the machine 20, it is expected that the output signal from the secondary winding 26 should be zero. However, because of reasons which are not completely understood, the signal output of the secondary winding is not zero but some finite value. An explanation for the presence of the signal from the secondary winding 26 may be attributed to uncontrollable variations in the windings of the secondary winding 26 and the inductive coupling between the primary winding 24 and the secondary winding 26. Compensation of the deviation of the output signal from the secondary winding 26 from zero or null is accomplished by connecting the terminal 66 in circuit with the switch A1 to the proper one of the taps T0–T10 so the output of the secondary winding 6TS changes the current flow between tap 7 and tap T13 to make the output signal of the secondary winding 26 zero. From the foregoing it is apparent that the output of the transformer 6T provides a vernier adjustment to vary the ratios of current flow through the portions of the primary winding to the right and left of tap 7 when the tenths switches V0–V9 and X0–X9 are respectively closed.

Similar compensation of the current in the right and left portions of the primary winding 24 are made when the tenths switches V2–V9 and X2–X9 are respectively adjusted to provide settings corresponding to 7.200, 7.300, 7.400, 7.500, 7.600, 7.700, 7.800 and 7.900, with the physical center of the secondary winding 26 accurately positioned by physical measurement at the respective settings relative to the machine 20. At each of the foregoing settings the proper switches A2–A9 are closed simultaneously with the corresponding tenths switches V2–V9 and X2–X0 and the proper terminal 66 associated with the switches A2–A9 is connected to one of the taps T0–T10 to eliminate the error in the output signal of the secondary winding 26 at the respective tenth inch position increments of the secondary winding 26 relative to any selected tap.

When all of the adjustments heretofore described have been made, it follows that the primary winding 24 circuits have to be adjusted so the secondary winding will provide a zero or null signal when the secondary winding 26 is positioned at the following locations relative to the machine: 7.000, 7.100, 7.200, 7.300, 7.400, 7.500, 7.555, 7.600, 7.700, 7.800 and 7.900.

Further adjustment of the resistors R1 and R2 will now be explained. It has been discovered that as the various taps 0–13 on the primary winding 24 are selected to require positioning of the secondary winding 26 at positions other than the center of the primary winding 24, as the distance from the center tap is increased, an increased error in the output signal from the secondary winding 26 occurs. This error in the output signal of the secondary winding 26 is believed to be caused by the unequal lengths of the portions of the primary winding 24 to the left and to the right of the selected tap. These unequal portions will provide an unequal current flow in the portions because of the unequal resistances of the unequal portions and an unequal flux distribution between the unequal lengths of the unequal portions and the secondary winding 26. These effects are most pronounced when a tap adjacent the respective ends of the primary winding 24 is connected to require positioning of the secondary winding 26 at a location adjacent the ends of the primary winding 24. For example, if switch S13 is closed to require positioning of the secondary winding 26 at some location intermediate 13.000 and 13.999, it will be seen that the portion of the primary winding 24 to the left of tap 13 will be 1 inch long, if the unused end turns on the left end of the primary winding 24 are ignored, while the portion of the primary winding 24 to the right of tap 13 will be 13 inches long, if the unused turns on the right end of the primary winding 24 are ignored. Thus one portion of the primary winding 24 will provide a resistance to current flow and a path for magnetic flux which is 13 times greater than the resistance of the other portion. The resistors R1 and R2 are included in the circuit to compensate for the unequal distribution of fluxes and resistances of the unequal lengths of the portions of the primary winding 24 as the various taps 0–13 are selected for positioning of the secondary winding 26.

After the adjustment of the components of the system has been accomplished so the secondary winding 26 will provide a zero or null output signal at any of the tenths inch positions between 7.000–7.900, the switch S6 is closed with all of the remaining switches S0–S13 open. The tenths switches V5 and X5, the hundredths switch C5, thousandths switch M5 and the switch A5 are closed with all of the remaining switches open to thus provide a setting of 6.555 inches as was previously described in connection with the 7.555 inch setting. The secondary winding 26 is then accurately positioned by physical measurement so it is physically centered at the 6.555 inch position on the machine 20. When the foregoing switches are closed to provide a setting of 6.555 inches and the secondary winding 26 is accurately positioned at the 6.555 inch location, the secondary winding 26 can be expected to provide an error output signal other than zero. This error output signal is eliminated by adjustment of the resistor R1 which is located between taps 7 and 6 so that the output signal of the secondary winding 26 becomes zero.

After the resistor R1 has been thus adjusted so the secondary winding 26 provides a zero output signal at the 6.555 position, the switches S6, V0, X0, C0, M0 and A0 are closed with all of the remaining switches in the system remaining open. Thus the primary winding 24 currents and switches are set to require positioning of the secondary winding at 6.000 inches on the machine 20. The secondary winding 26 is then accurately positioned by physical measurement so it is physically centered at the 6.000 inch position of the machine 20 and any error in the output signal from the secondary winding 26 is eliminated by adjusting the resistor R2 which is in series with the switch S6. The foregoing adjustment of R2 generally will cause a slight error to appear in the output signal of the secondary winding 26 when the secondary winding 26 and switches are adjusted to require the secondary winding 26 to be accurately positioned at the 6.555 inch position of the machine 20. A slight adjustment of the resistor R1 between taps 7 and 6 as above described will again restore the zero or null output signal of the secondary winding at 6.555 inches. This adjustment of the resistor R1 will require a slight additional adjustment of the resistor R2 as described when the secondary winding 26 was initially positioned at the 6.000 inch position so that the secondary winding 26 will provide a zero output signal at both the 6.000 and 6.555 positions of the machine 20 as well as the other positions between 7.000 and 7.900, as previously described.

It follows that a similar adjustment of the resistors R1 and R2 between each of the pairs of taps, that is, taps 6–5, 5–4, 4–3, 3–2, 2–1, 1–0, 9–8, 10–9, 11–10, 12–11, 13–12, and 14–13, will cause the secondary winding 26 to provide a zero or null signal at 5.555 and 5.000, 4.555 and 4.000, 3.555 and 3.000, 2.555 and 2.000, 1.555 and 1.000, 0.555 and 0.000, 8.555 and 8.000, 9.555 and 9.000, 10.555 and 10.000, 11.555 and 11.000, 12.555 and 12.000, 13.555 and 13.000. Further, as the switches A0–A9 which were previously connected with the proper taps T0–T10 to cause the transformer 6T to compensate the output signal of the secondary winding at each tenth inch increment between 7.000 and 7.900 and as the switches A0–A9 are each closed simultaneously with the respective closure of switches V0–V9 and X0–X9, it follows that a similar accuracy at the 1/10 inch points between the taps 0–14 will be achieved.

It will be seen from the foregoing that when the primary winding 24 is energized to require positioning of the secondary winding 26 at any of the X.555 positions, where X designates the closure of the switches S0–S13 or inch switch, the portions of the primary winding 24 to the right and left of the selected tap in circuit with switches S0–S13 each will be energized by a 50 volt source. Further, when the currents in the primary winding 24 are adjusted to require positioning of the secondary winding 26 at any X.000 position, the portion of the primary winding 24 to the left of the tap selected by the switches S0–S13 will be energized by a 61½₁₀ volt source and the portion to the right of the selected tap by a 38%₁₀ volt source. It will be observed that the primary windings 2TP and 3TP are arranged to be connected between the T5 tap of the secondary winding 1TS and either to the T5–T0 taps or to the T5–T10 taps through switches C0–C9 and M0–M9. Thus when the proper switches C6–C9 and M6–M9 are closed because of the polarities of the primary and secondary windings of transformers 2T and 3T, the voltage across the portion to the left of a tap on the primary winding 24 will be less than 50 volts while the voltage across the portion to the right will be correspondingly greater than 50 volts as to require positioning of the secondary winding between X.555 and X.999. Similarly, when the switches C4–C0 and M4–M0 are closed, the portion of the primary winding 24 to the left of the selected tap will be supplied with a voltage greater than 50 volts while the portion to the right will be supplied with a corresponding voltage of less than 50 volts so as to require positioning of the secondary winding between X. 555 and X.000.

The transformer 2T has a turns ratio of 10:1 and the transformer 3T has a turns ratio of 100:1. The voltage between each of the adjacent taps T1–T10 is two volts. Thus as the switches C6–C9 are successively closed the voltage output of the secondary windings of transformer 2T will successively increase in increments of 0.2 volt with the voltage having one polarity. Similarly, when the switches C4–C0 are successively closed, the voltage output of the secondary windings of transformer 2T will successively increase in increments of 0.2 volt with a voltage having a polarity opposite the voltage when switches C6–C9 were closed. As the transformer 3T has a ratio of 100 to 1, the closure of switches M6–M9 and M4–M0 will cause a similar polarity incremental voltage change of 0.02 volt as when the switches C6–C9 and C4–C0 were successively closed. Each incremental change as provided by the change in magnitude and polarities of the output voltage of the secondary windings of transformer 2T will require an incremental change in the positioning of the secondary winding 26 of $\frac{1}{100}$ inch and each similar incremental change of the output voltage of transformer 3T will require an incremental change of $\frac{1}{1000}$ inch of the secondary winding 26 relative to the machine 20. Further, as each incremental change is operative to increase the current on one portion of the primary winding 24 while decreasing the current flow in the other portion by an equal amount, it follows that any variations in the voltage of source 36 will be ineffective to change the ratios of the currents in the portions of the primary winding 24.

It will be observed that the primary winding 4TP has one end connected to a slider which is movable along a Variac VT and that the secondary windings 4TSL and 4TSR are connected to either add or subtract from the voltage in the left and right hand terminals of the primary winding 24. Thus if the slider is centered on the Variac, transformer primary 4TP will not be energized. However, if the slider on the Variac is moved in either direction on the Variac, energizing currents in primary winding 4TP will cause the secondary windings 4TSL and 4TSR to change the current flows in the respective portions of the primary winding to the left and right of any selected tap 0–13. This arrangement can be used to change the currents flowing at each of the selected taps of the primary winding 24 and cause a lateral shift in the position in either direction at all of the taps 0–13 at which the secondary winding 26 is required to be positioned to produce a zero output signal. Thus the energization of the transformer 4T may be used to provide a zero offset for the control system.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. An apparatus for determining the relative position of a pair of members which are relatively movable to one another, comprising: an elongated primary winding immovably mounted on one of the members, a relatively short secondary winding immovably mounted on the other of said members, said primary having a terminal at each end and a plurality of taps spaced along the primary winding between the end terminals, said taps including a tap located centrally of the end terminals and the remaining taps being spaced at equidistant intervals on the primary on opposite sides of the central tap, a single phase alternating current source having a pair of sides of opposite polarity, means including switch means having a plurality of individual switching contacts with each contact paired with one of the taps and a plurality of principal circuits each connecting an individual switching contact with its paired tap for selecting any one of the taps and connecting the selected tap to one of the pair of sides of the source, a first circuit means and a second circuit means each connecting one of the terminals of the primary winding to the side other than the said one side of the source so that each end terminal of the primary winding will be of like polarity and have a polarity opposite the polarity of any of the taps selected by the switch means whereby a pair of portions of the primary winding extending in opposite directions from any selected tap toward said end terminals are respectively energized with currents which flow in opposite directions at the selected tap, said secondary winding being inductively coupled to the primary winding and having an electrical center and a physical center arranged so the secondary winding provides a null output signal when the secondary winding is physically and electrically centered at a selected point on the primary winding, and means energized by the source and included in said first circuit means and in said second circuit means providing an output voltage for increasing current flow in one of said portions by predetermined selectable increments and equally decreasing current flow in the other of said portions for causing a displacement between the electrical and physical center of the secondary for dividing the spacing between any selected tap and an adjacent tap into predetermined increments.

2. In an electric positioning apparatus, the combination comprising: a primary winding having a terminal at each end and at least one tap unequally spaced between the end terminals thereby dividing the primary winding into a pair of unequal sections, a single phase alternating current source having a pair of sides of opposite polarity, means including switch means connecting the tap to one of the pair of sides of the source, a pair of circuits connecting both of the end terminals of the primary winding to the side other than the said one side of the source so that each end terminal will be of like polarity and have a polarity opposite the polarity of the tap for energizing said sections with a current flow from the source, a secondary winding inductively coupled to the primary winding and movable relative thereto, said secondary winding having a null output when the secondary winding is electrically centered over a predetermined position on the primary winding and having an alternating current induced therein the potential and phase of which depends on the degree and direction of physical displacement of the secondary winding relative to the predetermined position on the primary winding, and means energized by the source included in each of the pair of circuits and providing an output voltage for increasing the current flow in one of said sections by a predetermined amount and decreasing the current flow in the other section by an amount equal to the increased current flow and thereby changing the ratio of current flow in said sections and displacing the electrical center of said secondary which ratio of current flow in said sections remains constant and independent of variations of the source.

3. An electric positioning apparatus for use on a machine having a support member and a member movable relative to the support member, comprising: an elongated primary winding immovably mounted on one of said members, a relatively short secondary winding immovably mounted on the other of said members, said primary winding having a terminal at each end and at least one tap spaced between the end terminals located at a predetermined position relative to the said one machine member and thereby dividing the primary winding into a pair of sections each having a predetermined length, a single phase alternating current source having at least a pair of sides of opposite polarity, a first circuit means connecting the tap to one side of the source, a second and a third circuit means each connecting one of the terminals of the primary winding to the side other than the said one side of the source so that each end terminal will be of like polarity and have a polarity opposite the polarity of the tap for energizing said sections of the primary winding with currents which flow in opposite directions at said tap, said secondary winding being inductively coupled to the primary winding and having an electrical center depending upon a ratio of current flowing in said sections at said tap whereby said secondary will provide a null output signal when physically moved to a predetermined position relative to the primary winding and an alternating current output signal the potential and phase of which depends on the relative displacement of the secondary winding from said predetermined position, means energized from the source and included in said second and third circuits providing an output voltage for varying the current flow in the sections inversely in equal predetermined amounts for changing the electrical center of said secondary winding and thereby the position relative to the primary winding whereat the secondary winding provides a null output signal.

4. In an electric positioning apparatus, the combination comprising: an elongated primary winding having a pair of end terminals disposed toward the opposite ends thereof and a plurality of intermediate taps spaced at equidistant intervals between the end terminals, a source of single phase alternating current providing a pair of sides of opposite polarity, means including switch means having a plurality of individual switching contacts with each contact paired with one of the taps and a plurality of principal circuits each connecting an individual switching contact with its paired tap for selecting any one of the taps and connecting the selected tap to one of the pair of sides of the source, means connecting the side other than the said one side of the source to both of said end terminals, a secondary winding having a shorter length than and inductively coupled to the primary winding and axially movable relative to the primary winding, whereby a voltage is induced in the secondary winding by current flowing in the primary winding which has a magnitude and phase dependent upon the axial direction and distance of displacement of the secondary winding relative to a predetermined position on the primary winding and means connecting the selected tap to an intermediate tap adjacent the selected tap for compensating for variations in the inductive coupling between the primary winding and the secondary winding when the selected tap is displaced from a central position on the primary winding.

5. The combination as recited in claim 4 wherein the compensating means includes a potentiometer resistor having a pair of end terminals and a slider with the end terminals connected to the intermediate taps and the slider connected in circuit with the switching means.

6. The combination as recited in claim 4 wherein the slider is connected through an adjustable resistor to the switching means.

7. An apparatus for determining the relative position of a pair of members which are relatively movable to one another, comprising: an elongated primary winding immovably mounted on one of the members, a relatively short secondary winding immovably mounted on the other of said members, said primary having a terminal at each end and a plurality of taps spaced along the primary winding between the end terminals, said taps including a tap located centrally of the end terminals and the remaining taps being spaced at equidistant intervals on the primary on opposite sides of the central tap, a single phase alternating current source having at least a pair of sides of opposite polarity, means including switch means having a plurality of individual switching contacts with each contact paired with one of the taps and a plurality of principal circuits each connecting an individual switching contact with its paired tap for selecting any one of the taps and connecting the selected tap to one of the pair of sides of the source, a first circuit means and a second circuit means each connecting one of the terminals of the primary winding to the side of the source other than the said one side so that each end terminal of the primary winding will be of like polarity and have a polarity opposite the polarity of any of the taps selected by the switch means whereby a pair of portions of the primary winding extending in opposite directions from any selected tap toward said end terminals are respectively energized with currents which flow in opposite directions at the selected tap, said secondary winding being inductively coupled to the primary winding and having an electrical center and a physical center arranged so the secondary winding provides a null output signal when the secondary winding is physically and electrically centered at a selected point on the primary winding, a first means energized by the source and included in said first circuit means and in said second circuit means providing an output voltage for increasing current flow in one of said portions by predetermined selectable increments and equally decreasing current flow in the other of said portions for causing a displacement between the electrical and physical center of the secondary for dividing the spacing between any selected tap and an adjacent tap into predetermined increments, a second means energized by the source and included in circuit with the switch means providing an output voltage for varying current flows in both portions of the primary and thereby varying the displacement between the physical and electrical center of the secondary when the secondary is energized by unequal current flows in said portions for causing the physical center of the secondary to be displaced from the electrical center a distance from a position determined by an increment selected by said first means.

8. The combination as recited in claim 7 wherein the second means includes a transformer having a primary winding energized by the source and a secondary winding included in circuit with the switch means.

9. In an electric positioning apparatus, the combination comprising: an elongated primary winding having a terminal at each end and a plurality of taps spaced at equidistant intervals along the primary winding between the end terminals, a source providing single phase alternating current at a pair of opposite polarity sides, means including switch means having a plurality of individual switching contacts with each contact paired with one of the taps and a plurality of principal circuits each connecting an individual switching contact with its paired tap for selecting any one of the taps and connecting the selected tap to one of the pair of sides of the source, a second and a third circuit respectively connecting the side other than the said one side of the source to the end terminals of the primary winding, a secondary winding inductively coupled to the primary winding and axially movable relative to the primary winding, whereby a voltage signal is induced in the secondary winding by current flowing in the primary winding from the source which voltage signal has a predetermined value of magnitude and a phase dependent upon the axial position of the secondary winding relative to a predetermined position on the primary winding, and means energized by the source and included in circuit with the switch means for varying current flow at the selected tap to compensate for variations in the voltage signal in the secondary from said predetermined value when the secondary is axially displaced from the predetermined position.

10. An apparatus for determining the relative position of a pair of members which are relatively movable to one another, comprising: an elongated primary winding immovably mounted on one of the members, a relatively short secondary winding immovably mounted on the other of said members, said primary having a terminal at each end and a plurality of taps spaced along the primary winding between the end terminals, said taps including a tap located centrally of the end terminals and the remaining taps being spaced at equidistant intervals on the primary on opposite sides of the central tap, a single phase alternating current source having at least a pair of sides of opposite polarity, means including switch means having a plurality of individual switching contacts with each contact paired with one of the taps and a plurality of principal circuits each connecting an individual switching contact with its paired tap for selecting any one of the taps and connecting the selected tap to one of the pair of sides of the source, a first circuit means and a second circuit means each connecting one of the terminals of the primary winding to the side other than the said one side of the source so that each end terminal of the primary winding will be of like polarity and have a polarity opposite the polarity of any of the taps selected by the switch means whereby a pair of portions of the primary winding extending in opposite directions from any selected tap toward said end terminals are respectively energized with currents which flow in opposite directions at the selected tap, said second winding being inductively coupled to the primary winding and having an electrical center and a physical center arranged so the secondary winding provides a null output signal when the secondary winding is physically and electrically centered at a selected point on the primary winding, and a means energized by the source and included in said first circuit means and in said second circuit means providing an output voltage for increasing by an adjustable amount the current flow in one of said portions while equally decreasing the current flow in the other of said portions for causing an adjustable displacement between the electrical and physical center of the secondary winding when the secondary is positioned at any selected location on the primary for providing a zero offset for the positioning apparatus.

References Cited
UNITED STATES PATENTS

| | | | |
|---|---|---|---|
| 2,962,652 | 11/1960 | Bulliet et al. | 323—53 |
| 3,004,200 | 10/1961 | Phillips | 323—43.5 X |
| 3,089,989 | 5/1963 | Rave | 323—43.5 X |
| 3,244,956 | 4/1966 | Mierendorf | 318—20.515 |

JOHN F. COUCH, *Primary Examiner.*

A. D. PELLINEN, *Assistant Examiner.*